United States Patent [19]
Kuhlmann

[11] 3,985,522
[45] Oct. 12, 1976

[54] METHOD AND APPARATUS FOR SEPARATING SOLID PARTICLES FROM A MIXED FLUID STREAM

[75] Inventor: Henry Kuhlmann, Bena, Va.

[73] Assignee: Deepsea Ventures, Inc., Gloucester Point, Va.

[22] Filed: Feb. 13, 1973

[21] Appl. No.: 332,191

Related U.S. Application Data

[63] Continuation-in-part of Ser. No. 148,253, May 25, 1971, abandoned.

[52] U.S. Cl. .................................. 55/52; 55/204; 55/399; 210/84; 210/304; 210/512 R
[51] Int. Cl.² ........................................ B01D 53/24
[58] Field of Search ..................... 55/52, 204, 399; 209/144, 211, 273, 305; 210/65, 84, 304, 512 R

[56] References Cited
UNITED STATES PATENTS

| | | | |
|---|---|---|---|
| 1,880,273 | 10/1932 | Pardee et al. | 210/304 X |
| 2,222,930 | 11/1940 | Arnold | 55/399 X |
| 2,343,682 | 3/1944 | McCurdy | 210/512 X |
| 2,913,114 | 11/1959 | Plaven | 209/273 |
| 2,998,137 | 8/1961 | Vane | 209/211 X |
| 3,399,770 | 9/1968 | Salomon | 210/512 R X |
| 3,513,642 | 5/1970 | Cornett | 209/144 X |
| 3,754,658 | 8/1973 | Messing | 210/304 |

FOREIGN PATENTS OR APPLICATIONS

| 1,206,619 | 2/1960 | France | 209/305 |

Primary Examiner—Charles N. Hart
Assistant Examiner—Richard W. Burks
Attorney, Agent, or Firm—Barry G. Magidoff

[57] ABSTRACT

Method and apparatus for separating solid particles from a mixed fluid stream is provided by this invention. The method comprises helically guiding a fluid mixture of particles and liquid into a porous-walled chamber, discharging the fluids centrifugally from the chamber and recovering the particles at the bottom of the chamber. Apparatus, in accordance with the present invention, includes a helical conduit, in fluid flow connection with a porous chamber, a spiral deflector extending from the top of helical conduit downwardly into the chamber so as to deflect the particles downwardly as the water is ejected centrifugally through the sides of the chamber. When gas is mixed with the liquid, as is the case for example when an air lift pump is used for lifting water and solids from ocean floor, the apparatus of this invention can separate gas from the liquid when the porous chamber is placed within a solid walled container; the liquid and gas flowing outwardly through the porous wall of the chamber strikes the outer shell, causing gas to be released and removed upwardly and the liquid to fall downwardly, in the annular space between the chamber and the outer container.

10 Claims, 6 Drawing Figures

INVENTOR
HENRY KUHLMANN
BY David H. Semmes
ATTORNEY

INVENTOR
HENRY KUHLMANN
BY David H. Lemmer
ATTORNEY

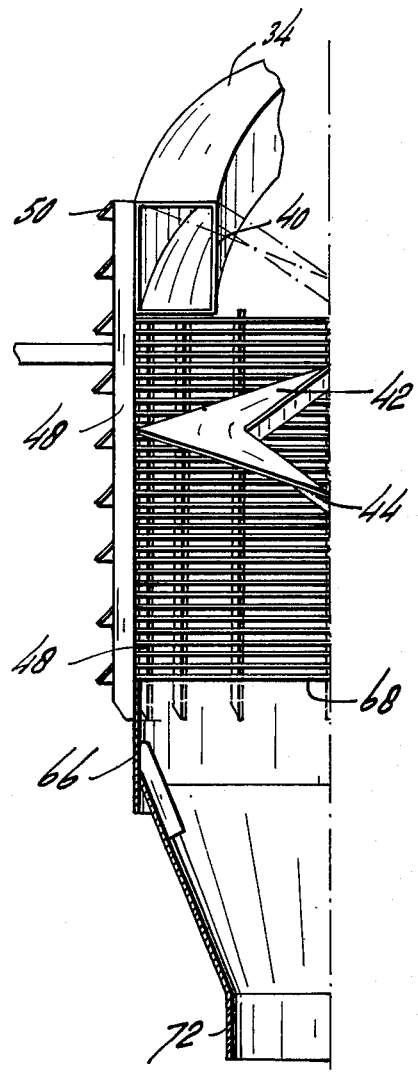
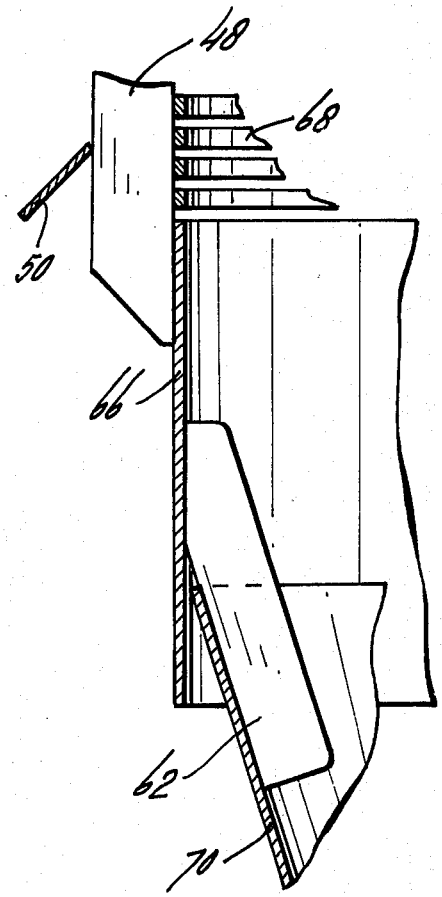
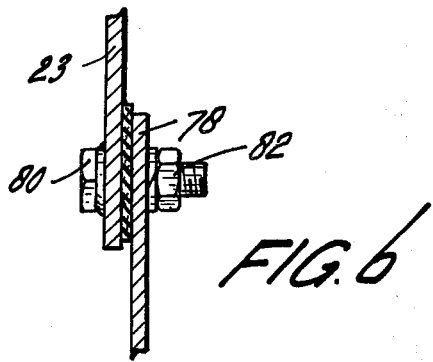
FIG. 4　　　FIG. 5
FIG. 6
INVENTOR
HENRY KUHLMANN
BY David H. Semmes
ATTORNEY

METHOD AND APPARATUS FOR SEPARATING SOLID PARTICLES FROM A MIXED FLUID STREAM

This application is a continuation-in-part of U.S. application Ser. No. 148,253 filed May 25, 1971 and now abandoned.

A great deal of recent attention has been given to underwater mining of the sea bed, which includes recovery of manganese nodules by entraining the nodules within a conduit suspended downwardly from a mining vessel. The conduit may have a gathering head contacting the sea bed and a discharge head mounted upon the floating mining vessel. A great quantity of air and sea water is entrained, along with the nodules, and is required to be separated from the nodules at the discharge head aboard the mining vessel. Thus a foaming, three-phase mixture of gas, liquid and solid often must be separated.

Centrifugal separators have often been used for the separation of particulate solids from, for example, a liquid stream carrying the solids. For example, McCurdy, in U.S. Pat. No. 2,343,682, describes a conventional type of separator where the fluid stream is whirled around the chamber, the heavier particles moving radially outward and the lighter liquid being collected towards the center.

In accordance with the present invention, solid particles can be separated from a mixed fluid stream flowing at a high linear velocity, comprising a liquid and entrained solid particles. In a usual embodiment, the stream is a three phase gas-liquid-solid mixture formed of a foaming stream of liquid and gas which are mixed, usually suspended, solid particles. Generally, the process of this invention comprises discharging a liquid-solid stream within a porous-walled chamber, preferably a cylindrical tube, in a direction substantially tangential to the interior surface of the tube; discharging the liquid through the porous walls of the tube as the stream moves helically around the inner surface of the tube, while confining the solid phase within the chamber; and recovering the solids from within the chamber after the liquid is removed. Generally the porous chamber is a tube arranged with its axis in a vertical direction and the stream is discharged into the tube with a downwardly component of velocity.

Preferably, the liquid discharged through the porous-walled chamber is collected and separated from any gas phase present by permitting the discharged liquid to strike the inner surface of an outer wall surrounding the porous chamber, resulting in the breaking up of foam. The gas phase passes out in an upwardly direction and the liquid downwardly through the intermediate volume between the porous wall and the outer wall. To avoid the entrainment of liquid in the upward flow of gas, the liquid passing through the porous wall is preferably directed downwardly. The liquid can be collected from the bottom of the intermediate volume.

In a preferred embodiment, the stream including the solid particles is downwardly guided in a generally helical path as it passes downwardly within the porous tube, thus gradually decreasing the velocity of the particles so as to decrease the impact experienced by the particles. This avoids breakage of the particles into small particles, or fines, which may be less desirable or more difficult to handle. Guiding the stream of particles so as to slow them down, permits utilizing this invention for separating liquid-solid streams having a wide range of linear velocities.

Apparatus for separating solid particles from a liquid in which they are entrained in accordance with this invention comprises a chamber, generally a substantially cylindrical tube, having a porous wall, fluid inlet means designed and adapted to direct fluid flow into the upper end of the chamber in a direction generally tangential to the wall of the chamber, the fluid tending to flow in a generally helical direction downwardly along the inner surface of the tube wall, the liquid passing outwardly through the porous wall and the solids passing downwardly within the tube. Preferably, helical guide means are provided within the chamber extending from a position above the fluid inlet means so that it serves to guide the solid particles in a helical path downwardly, generally in a position parallel to the longitudinal axis of the chamber. The helical guide means are preferably adjacent to the inner surface of the porous wall of the chamber extending from the upper edge of the inlet. Most preferably, except for the guide means, the chamber permits substantially unimpeded fluid flow.

Although this apparatus is designed to separate fluid streams moving at high linear velocities, it is desirable, often, to initially decrease linear velocity before passing through the inlet. To accomplish this a curved, spiral or helical conduit is in fluid flow connection to the fluid inlet. For best results, the fluid flow inlet to the chamber, has a polygonal, especially a quadrilateral, cross-section; the conduit immediately connected to the inlet has the same cross-section. Circular cross-sectioned pipe can be connected to the polygonal pipe by known means.

Generally, collection means are provided at the bottom of the porous-walled chamber to collect the solid particles. To collect the liquid passing out through the porous wall, a container is provided around the porous tube. Preferably, the container is a substantially cylindrical tube and substantially concentric with the preferred inner porous-walled tube. Collection and delivery means can be provided at the bottom of the container for collecting and removing liquid.

This device can be used for separating a three-phase mixture, the gas passing through the wall with the liquid, and then passing up the annular space between the tube and the container. To improve the efficiency of this separator, when treating a foaming liquid, the inner surface of the container wall should be sufficiently close to the porous wall of the chamber that the fluid passing through the porous wall strikes the wall of the container. This aids in breaking up the foam. To further limit any entrainment of liquid with the upwardly flowing gas, deflector means are provided at the porous wall, directing the fluid, after passing through the porous wall, in a downwardly direction.

The porous wall can be formed of a mesh formed by vertical and horizontal members. The mesh openings should be sufficiently small to prevent passage of the solid particles to be separated. The length and diameter of the chamber and the porosity of the wall, should be such as to permit passage of substantially all of the liquid so as to separate it from the solid particles.

This invention is especially effective for the separation of ocean floor nodule ore from sea water. The ocean floor nodule particles can be dredged up from the ocean floor by an airlift pumping system in a three-phase air-water(foam)-solid system. The pores, or mesh openings, in the porous wall should be of a size insufficient to pass most of the nodule ore particles. Although it is recognized that any fines present may be discharged with the fluid.

Referring to the drawings:

FIG. 4 is a fragmentary elevation sectioned along line 4—4 showing the mounting of the intake opening and spiral deflector within the chamber of the separator;

FIG. 5 is an enlarged elevation, partially in section, showing the construction of one embodiment of the porous wall and means to downwardly deflect the fluid passing therethrough; and FIG. 6 is an enlarged fragmentary elevation showing the mounting of the bolted manhole at the bottom of the casing.

Figure 1:
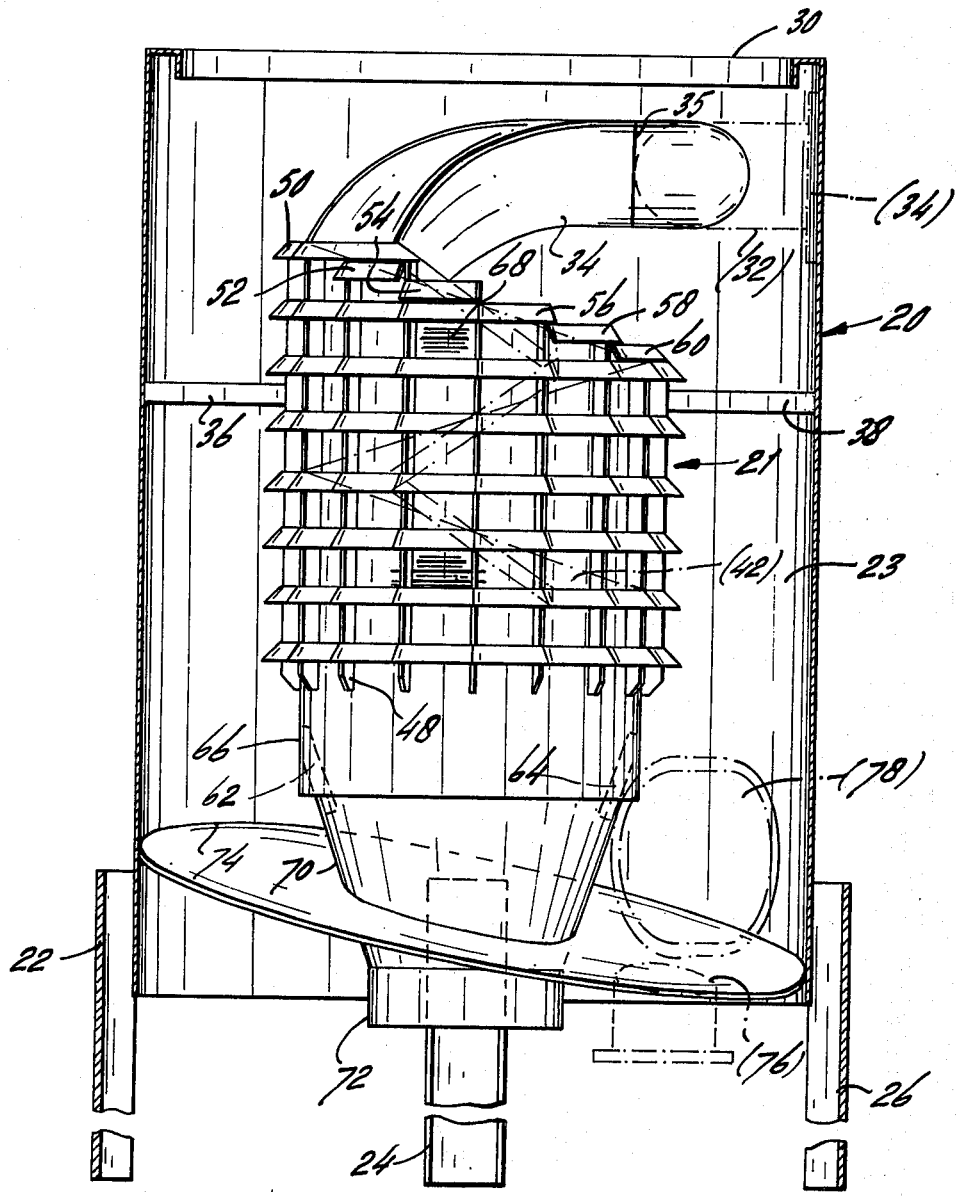
FIG. 1 is a front elevation, partially in section, showing the separator in accordance with the present invention.
Figure 2:
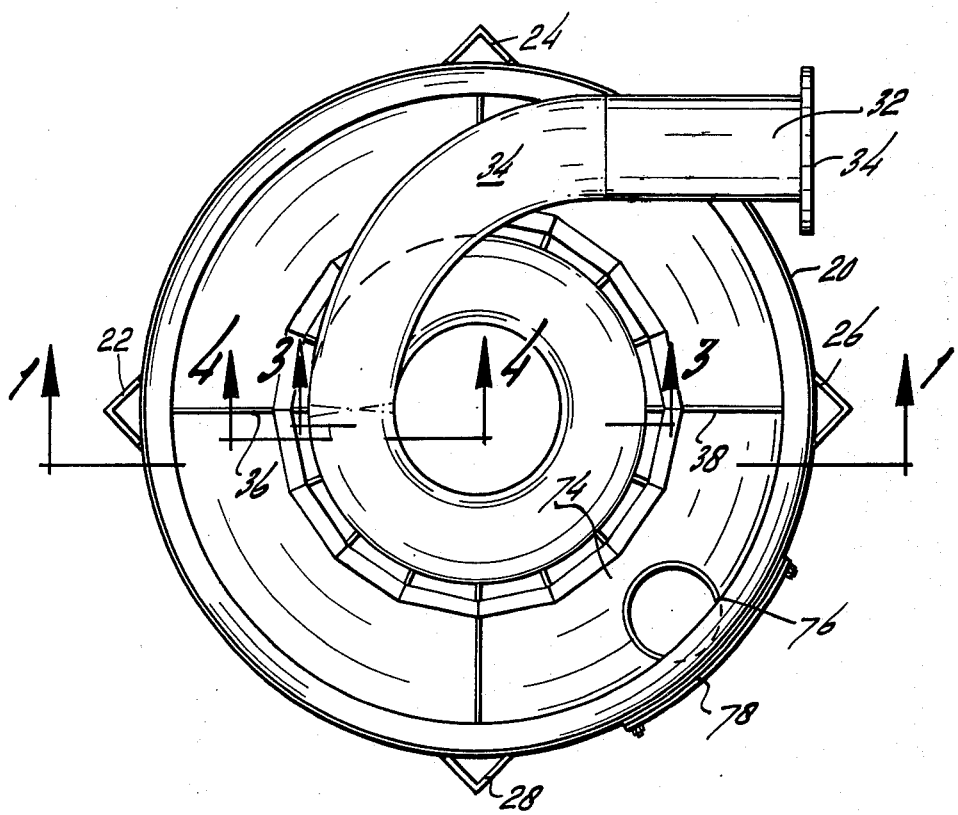
FIG. 2 is a top plan thereof.
Figure 3:
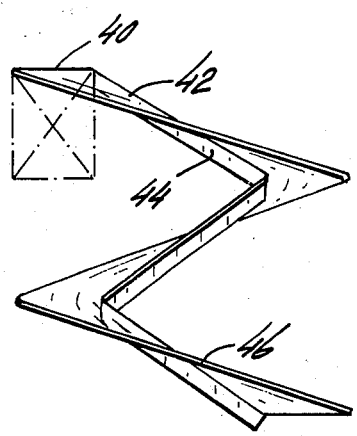
FIG. 3 is a front elevation of the spiral deflector.

Referring to FIG. 1, an outer container casing 20 having an angle iron stiffener 30 at its top is shown supporting a porous-walled chamber, which in this embodiment can be described as a foraminous cage, generally designated 21, by means of a plurality of brackets 36, 38. Casing 20 can be mounted upon, e.g. 6 × 6 × ½ in., angle iron legs 22 (FIG. 2). A circular intake pipe 32 is mounted in bracket 34 and is transitioned to a rectangular intake pipe 34 as at butt weld 35, so as to define rectangular discharge portal 40 (FIG. 4) measuring, e.g. 9 × 12 in.

A spiral deflector 42 extends from the portal 40 downwardly, spirally towards the bottom of the cage. The spiral deflector can include a single downwardly extending flange 44 on its inside edge, its outside edge 46 being welded to a series of horizontal rings 68, e.g. of ¼ × ½ × 36 in. diameter, which define the cage periphery. The rings 68 are connected as by welding to vertical supports 48, e.g. 2 × ¼ inches. A plurality of downwardly and outwardly inclined spray deflectors 50, 52, 54, 56, 58 and 60 are secured to the outside of supports 48. A support apron 66 is mounted at the bottom of the cage 21 and includes a plurality of brackets 62 and 64, e.g. 2 × ¼ inches, which extend inwardly to support nodule discharge cone 70. A cone extension 72, e.g. of 21 inches O.D., can lead to an axial nodule recovery bin (not illustrated).

Bottom pan 74 is supported around cone exterior 72 upon an inclined axis, such that the lowest part of its rim is supported e.g. 18 inches beneath its upper-most part. A standard pipe drain 76 leads from the lowest part of the pan 74 so that liquid discharged centrifugally through the sides of the cage and into the annulus 23 defined between the cage 21 and the inside wall of the housing 20 can drain from the apparatus. Manhole cover 78 is bolted to the casing 20, as illustrated in FIG. 6, by means of square head bolt 80 tack welded to the sides of casing 20 and having a one-quarter inch thick rubber gasket 81 with nut and washer assembly 82. The manhole cover can be removed to provide access to the interior.

The illustrated device has separated nodules from sea water under ambient conditions at a rate of 60 tons of nodules per hour.

Other constructions for the porous-walled chamber and spiral deflectors can be employed and the suggested structure can be enlarged or diminished without departing from the spirit of the invention.

What is claimed is:

1. A method of separating solid ocean floor ore particles from a liquid in a three-phase foaming fluid, the method comprising: (a) discharging a stream of a three-phase foaming fluid, comprising water, gas and solid ocean floor ore particles contained therein, within a porous walled chamber in a downward direction substantially tangential to the interior surface of the chamber at the point of discharge; (b) downwardly guiding the discharge stream beginning at the time of discharge in a helical path around the inner surface of the chamber wall; (c) axially confining the solid particles within the chamber and permitting the discharge of the liquid and gas outwardly through the porous wall as the mixture is helically guided downwardly; and (d) recovering the solid particles from within the chamber after the liquid and gas are discharged.

2. The method of claim 1 comprising in addition downwardly guiding the liquid and gas passing outwardly through the porous wall and causing the downwardly guided liquid and gas to strike against a solid wall, exterior of the porous wall, so as to cause disengagement of the gas from the liquid and wherein the liquid is discharged downwardly and the gas in an upward direction.

3. A method of separating ocean floor nodule ore particles from a liquid in a three-phase foaming fluid, the method comprising: (a) discharging a stream of a three-phase foaming fluid, comprising water, gas and ore particles contained therein, within a porous walled chamber in a downward direction substantially tangential to the interior surface of the chamber at the point of discharge; (b) downwardly guiding the discharge stream beginning at the time of discharge in a helical path around the inner surface of the chamber wall; (c) axially confining the ore particles within the chamber and permitting the discharge of the liquid and gas outwardly through the porous wall as the mixture is helically guided downwardly; and (d) recovering the ore particles from within the chamber after the liquid and gas are discharged.

4. A method of separating solid particles from a liquid, the method comprising: (a) guiding a three-phase foaming fluid comprising water, air and ocean floor nodule ore particles, the foaming fluid being the effluent from an air lift pumping system, through a helical conduit having a polygonal cross-section; (b) discharging the stream of fluid from the helical conduit into a porous-walled chamber in a direction substantially tangential to the interior surface of the chamber at the point of discharge; (c) downwardly guiding the discharge stream in a helical path around the inner surface of the chamber wall; (d) axially confining the solid particles within the chamber and permitting the discharge of the liquid outwardly through the porous wall as the mixture is helically guided downwardly; and (e) recovering the solid particles from within the chamber after the liquid is discharged.

5. A centrifugal separator for water and nodules, comprising:
   A. an outer casing having a bottom discharge drain;
   B. a foraminous cylindrical cage, including:
      i. a plurality of vertically spaced horizontal rings supported at the outer periphery of said cage;
      ii. a plurality of vertically extending supports mounted on said rings; and
      iii. a plurality of downwardly inclined horizontal baffles offset with respect to said horizontal rings, so as to deflect water downwardly into an annulus surrounding said cage;

C. a helical injection conduit having means for fluid connection outside of the casing and extending within said outer casing to the top inside of said cage, the open end of said conduit forming fluid inlet means for directing fluid into the cage; and D. a spiral deflector extending from the top of said inlet means downwardly into said cage.

6. A centrifugal separator for water and nodule mixtures as in claim 5, including:

E. a support apron and cone extension mounted at the bottom of said cage; and

F. a nodule recovery cone mounted within said support apron and extending downwardly to a nodule recovery portal, so as to axially recover said nodules.

7. A centrifugal separator for water and nodule mixtures as in claim 6, including:

G. an inclined recovery pan encircling said nodule recovery cone at the bottom of said chamber and leading to said botton discharge drain.

8. A centrifugal separator for water and nodule mixtures as in claim 7, said helical injection conduit having an initial circular cross-section portion extending within the outer casing and a final rectangular cross-section portion connected to said spiral deflector at the inlet means.

9. A centrifugal separator for water and nodule mixtures as in claim 8, said spiral deflector having:

i. a flat top surface leading downwardly from the top of said final rectangular cross-section inlet means; and ii. a vertical flange extending downwardly from one edge of said top surface, so as to deflect said mixture outwardly.

10. A centrifugal separator for water and nodule mixtures as in claim 9, said deflector being secured at its sides to the inner surfaces of said vertically spaced horizontal rings.

* * * * *